United States Patent Office 2,959,613
Patented Nov. 8, 1960

2,959,613
OXIDATION PROCESS

Gordon Howard Whitfield, Norton-on-Tees, England, assignor to Imperial Chemical Industries Limited, London, England, a corporation of Great Britain No Drawing. Filed Jan. 20, 1958, Ser. No. 709,751

Claims priority, application Great Britain Feb. 8, 1957

8 Claims. (Cl. 260—524)

This invention relates to a process of liquid phase oxidation.

Prior to the present invention there was a large number of processes for the oxidation of organic compounds in the liquid phase by means of oxygen or ozone containing gases. Included among these were a process for the oxidation of aliphatic aldehydes to the corresponding carboxylic acids using catalysts of variable valence such as manganese, cobalt, or lead, acetates; and a process for the oxidation of alkyl aromatic hydrocarbons to the corresponding carboxylic acid using as catalyst a metal or mixture of metals of variable valence, if desired together with halogen or a halide, e.g. bromine, which was sometimes conducted in the presence of a solvent, e.g. a lower aliphatic monocarboxylic acid.

We have found that in processes of these sorts the aliphatic carboxylic acid is degraded and that the efficiency of the process falls because of lower yield, and/or the operating costs rise because of degradation of the relatively expensive aliphatic acid and of the need for removing the degradation products. We have now found that in these processes the aforesaid disadvantages may be considerably decreased by arranging for the presence in the reaction medium of basic ions.

According to this invention there is provided a process for the oxidation of organic compounds conducted in the liquid phase by means of molecular oxygen or ozone employing as catalyst at least one metal of variable valence, in which a saturated aliphatic monocarboxylic acid is present as medium, or product of reaction, characterised in that the oxidation is conducted in the presence of cations corresponding to a concentration within the range of from 0.25 to 0.00025 gram atom per gram mole of total organic compounds, preferably from 0.05 to 0.0025 gram atom per gram mole aforesaid. If several organic compounds are present, then the gram mole specified in the above definition is taken as the sum of the gram mole fractions of the said compounds. While it is desirable, it is not necessary, that all of the cation is in ionic form.

While the use of any basic ions is within the scope of the invention it is preferred to use those of the alkali metals or alkaline earth metals: lithium, sodium, potassium, rubidium, caesium, calcium, strontium and barium. Beryllium, magnesium, zinc and cadmium are also effective but to a lesser degree. Suitable compounds of the metals are, for example, the oxides, hydroxides, carbonates, phosphates, halides, or carboxylates, e.g. acetates, propionates, naphthenates. Basic ions seem to modify the catalyst.

In the oxidation of aliphatic aldehydes to acids according to the process, suitable catalysts comprise, for example, compounds of manganese, cobalt, lead or cerium. If desired halogens, especially bromine may also be present, e.g. as the halides of metals of variable valence. If halogen is present the basic ion may be introduced as a compound of the halogen, e.g. sodium bromide or barium bromide. In this process fairly wide ranges of temperature may be used, e.g. 0 to 150° C. Pressure is not necessary, but may be used if desired.

This process is of especial value for the production of saturated aliphatic acids from the corresponding aldehydes, especially those containing in the molecule from 2 to 15 carbon atoms. The following procedure is especially suitable for the oxidation of propionaldehyde, but is also applicable to the oxidation of the other aldehydes. With higher aldehydes it may be desirable to use a solvent, e.g. an aliphatic acid.

The metal of variable valence is preferably either manganese or cobalt or combinations thereof, added in a total metal concentration of between 1.0 and 0.00001 gram atom per gram mole of propionaldehyde, more usually within the range 0.001 to 0.00001 gram atom/gram mole of aldehyde. Basic ions of the types defined above are added at a concentration of from 0.25 to 0.00025 gram atom per gram mole of organic compound present, usually from 0.05 to 0.0025 gram atom per gram mole, added e.g. as carboxylate such as propionate, acetate; or as mono-, di- or tri-basic phosphates; or as halides etc. Oxidation temperatures may be between 0° and 150° C., and it is an advantage of the process that higher oxidation temperature may be used in the presence of basic ion, as this latter prevents degradative oxidation of the product. A higher oxidation temperature enables the reaction to be controlled by water cooling and hence avoids refrigeration, which is expensive. The oxidising gas may be air or oxygen at atmospheric pressure, elevated pressure, or even subatmospheric pressure. Means for dispersing the gas in the liquid may be provided or alternatively for dispersing the liquid in the gas. Such processes may be operated batchwise or continuously.

The oxidation of alkylated compounds of aromatic character or their closely related oxygenated derivatives in the presence of an aliphatic monocarboxylic acid and of a metal of variable valence can be conducted at, for example, 50° to 300° C. and at atmospheric or superatmospheric pressures of up to 200 atmospheres. The catalysts may be employed as compounds of the metals such as their carboxylates, e.g. the acetates, propionates, nonanoates, naphthenates, of manganese, cobalt, lead cerium, vanadium etc. Improved results are obtained in this process when the catalyst comprises halogen or a halide, especially bromine, in addition to the metal of variable valence. Especially suitable catalysts are the mixed bromides of manganese and cobalt. It is often convenient to introduce the basic ion in chemical combination with bromine, e.g. as sodium, potassium, calcium or barium bromide. Suitable proportions of the catalytic substances are from 1 to 0.0005 gram atom of total metal per gram mole of oxidisable starting material, preferably 0.1 to 0.001 gram atom of total metal per gram mole aforesaid; and of halogen, e.g. bromine, from 2 to 0.001 gram atoms per gram mole of starting material, preferably from 0.2 to 0.002 gram atom per gram mole aforesaid. The ratio of the one metal to the other may be varied within these ranges of total metal. Preferably the ratio of manganese to cobalt is about 2:1, although up to about 9:1 gives good results. Suitable proportions of manganese dibromide ($MnBr_2.4H_2O$) and of cobaltous bromide ($CoBr_2.6H_2O$) are, respectively, 0.1 to 200%, preferably 0.65 to 0.85%, and 0.05 to 100%, preferably 0.33 to 0.48% by weight of the compound to be oxidised, assuming a molecular weight of 100 and proportionally for other compounds.

Examples of alkyl aromatic hydrocarbons which can be oxidised to the corresponding acids according to the process are: the xylenes which yield the corresponding phthalic acids; the diisopropyl benzenes which also yield the corresponding phthalic acids; toluene or cumene which yield benzoic acid; mesitylene which yields trimesic acid; methyl naphthalenes which yield naphthoic acids; and esters such as benzyl benzoate which yields benzoic acid, and methyl para-toluate, which yields methyl hydrogen terephthalate. However, it has been found difficult to oxidise tertiary carbon atoms directly attached to a carbon of the ring. Examples of oxygenated derivatives which can be oxidised to the corresponding acids according to the process are: benzyl alcohol, which yields benzoic acid; benzaldehyde which yields benzoic acid; acetophenone which yields benzoic acid; and paratoluic acid which yields terephthalic acid.

Examples of heterocyclic compounds of aromatic character that can be oxidised are the methyl pyridines which yield the corresponding pyridinic acids.

Moreover, hydrocarbons of aromatic character substituted by at least one alkyl, haloalkyl or closely related oxygenated derivative of an alkyl or haloalkyl group and by at least one polar group resistant to oxidation selected from: halogen, —$SO_2NR'R''$ (R', R''=alkyl, aryl or H), —OR (R=alkyl, aryl), NHCOR (R=alkyl, aryl or H), —OCOR (R=alkyl, aryl or H), —$SO_3R$ (R=alkyl, aryl or H), NR'R'' (R=alkyl, aryl or H), —CONR'R'' (R=alkyl, aryl or H), benzoyl, substituted benzoyl or alkyl carboxylic ester, can also be oxidised to the corresponding carboxylic acids. Examples of such compounds are: para- and meta-chlorotoluene; para- and meta-toluene sulphonamides; para- and meta-cresyl benzoates; para-toluene sulphonic acid; methyl para-toluene suphonate; para-toluamide; beta'-picolines. The halo-methylation products of toluene or benzene, especially the chloro- and bromo- ones, may also be oxidised according to the invention to the corresponding carboxylic acids.

The molecular oxygen may be introduced as air or diluted air or as ozonated air.

EXAMPLE 1

In a blank experiment oxygen in well dispersed form was passed at the rate of 12 litres per hour through 200 grams of propionic acid containing 1.0 gram of $CoBr_2 6H_2O$ at the boiling point of the liquid (137° C.) under atmospheric pressure for 7 hours. Analysis of the exit gas stream showed 28.6 volume percent of carbon dioxide and 12 grams of water, which is clear evidence of considerable degradative oxidation of the propionic acid.

Operating according to the invention, 200 grams of propionic acid containing 1.0 gram of $CoBr_2 6H_2O$ and 5.0 grams of sodium bromide was treated in exactly similar manner as in the blank experiment. Analysis of the exit gas stream showed the absence of carbon dioxide and of water. This is clear evidence of the inhibition of degradative oxidation of the propionic acid.

EXAMPLE 2

This experiment was conducted in the manner of Example 1 with a charge consisting of propionic acid (200 grams), $CoBr_2 6H_2O$ (1.0 gram), $Co(OAc)_2 4H_2O$ (5.0 grams) and $MnBr_2 4H_2O$ (0.1 gram). Well dispersed oxygen was passed at a rate of 12 litres/hour through the boiling solution and water was continually removed as formed. Throughout a four hour oxidation period the exit gas stream contained an average of 29.7 volume percent of carbon dioxide, and at the end of this period carbon dioxide was still being vigorously evolved. At this point 1.0 gram of sodium bromide was added and evolution of carbon dioxide and formation of water ceased, showing suppression of oxidative degradation of the propionic acid. During the hour following the addition of the sodium bromide the average carbon dioxide content of the exit gas stream was 0.5 volume percent.

EXAMPLE 3

(i) Blank

A charge consisting of 600 grams of propionic acid, 0.59 gram of cobalt bromide ($CoBr_2.6H_2O$) and 1.14 grams of manganese bromide ($MnBr_2.4H_2O$) was heated to 180° C. in a stainless steel reactor under an oxygen pressure of 150 p.s.i.g., and oxygen at a pressure of 150 p.s.i.g. was introduced at a rate of 200 litres/hour (measured at atmospheric pressure into the bottom of the reactor through a 1/8" bore standpipe for 8 hours. Samples of the exit gas were analysed periodically for oxides of carbon and the figures obtained were as follows:

| Time: hours | 0.25 | 1.25 | 2.25 | 3.25 | 4.25 | 5.25 | 6.25 | 7.25 |
|---|---|---|---|---|---|---|---|---|
| Volume percent in off-gas of $CO_2$ | 16.4 | 9.8 | 10.0 | 6.6 | 5.0 | 4.0 |  | 3.7 |
| $CO$ | 5.6 | 3.0 | 1.7 | 1.7 | 1.0 | 1.0 |  | 1.0 |

(ii) Operation according to the invention

The above experiment was repeated in identical manner except that 6.0 grams of sodium hydroxide was added. The following results were obtained.

| Time: hours | 0.25 | 1.25 | 2.25 | 3.25 | 4.25 | 5.25 | 6.25 | 7.25 |
|---|---|---|---|---|---|---|---|---|
| Volume percent in off-gas of $CO_2$ | 0 | 0.5 | 0.8 | 0.7 | 1.2 | 1.0 | 1.1 | 1.1 |
| $CO$ | 2.0 | 2.0 | 1.0 | 0.8 | 1.2 | 1.0 | 1.2 | 1.2 |

It is evident that oxidation of the propionic acid to oxides of carbon is considerably reduced.

EXAMPLE 4

The experiments described in Example 3 were repeated using acetic acid (600 grams) in place of propionic acid. The results, given below, show that in this case also oxidative degradation is suppressed by addition of the sodium ion.

| Time: hours | 0.25 | 1.25 | 2.25 | 3.25 | 4.25 | 5.25 | 6.25 | 7.25 | Experiment |
|---|---|---|---|---|---|---|---|---|---|
| Volume percent in off-gas of $CO_2$ | 1.4 | 0.9 | 0.7 | 1.0 | 0.8 | 0.5 | 0.7 | 0.8 | Without sodium hydroxide. |
| $CO$ | 1.2 | 1.0 | 0 | 0 | 0 | 0 | 0 | 0 |  |
| $CO_2$ | 0.3 | 0.3 | 0.2 | 0.2 | 0.2 | 0.5 | 0.6 | 0.2 | With added sodium hydroxide. |
| $CO$ | 1.6 | 0 | 0 | 0 | 0 | 0 | 0 | 0 |  |

EXAMPLE 5

The experiments described in Example 3 were repeated except that barium hydroxide, $Ba(OH)_2.8H_2O$ (47.3 grams) was added in place of sodium hydroxide. The results given below indicate that barium is effective also in suppressing oxidative degradation. The blank experiment was carried out immediately before the run using barium, in order to be certain that conditions were such that degradation would still occur, i.e., that no sodium remained in the reactor.

(NaOAc.3H$_2$O). In this case also oxygen uptake was almost complete and the reaction over in 5 hours. The product weighed 252.7 grams, and 1.3 grams of material was collected in the cold catch-pots.

In contrast, however, the carbon dioxide content of the exit gas in this run was extremely small, and analysis of the reaction product as in (i) showed the following yields

| Time: hours | 0.25 | 1.25 | 2.25 | 3.25 | 4.25 | 5.25 | 6.25 | 7.25 | Experiment |
|---|---|---|---|---|---|---|---|---|---|
| Volume percent in off-gas of. {CO$_2$ | 4.5 | 4.3 | 3.7 | 3.8 | 5.2 | 3.3 | 2.3 | 2.4 | } Blank experiment without barium. |
| CO | 1.3 | 1.2 | 1.0 | 1.0 | 1.0 | 1.2 | 0.9 | 1.0 | |
| CO$_2$ | 0 | 0 | 1.0 | 0.5 | 0.5 | 0.5 | 1.0 | 1.0 | } With barium hydroxide added. |
| CO | 0 | 0 | 0 | 0 | 0 | 0 | 0 | 0 | |

EXAMPLE 6

This illustrates the use of sodium ion to suppress degradation in the autoxidation of propionaldehyde to propionic acid.

(i) Blank

The charge consisting of 200 grams of propionaldehyde/water azeotrope (98% propionaldehyde) and 0.1 gram of manganese acetate (Mn(AOc)$_2$.4H$_2$O), was held in a glass reactor and 12 litres/hour of oxygen was introduced at atmospheric pressure through the hollow shaft of a cruciform stirrer revolving in the reaction mixture at 1000 r.p.m. The off-gas line from the reactor contained two water condensers and two cold catch-pots. The temperature in the reactor was held at 25° to 30° C. by means of an external cooling bath containing circulating water. The off-gas from the reactor was mixed with air fed at 12 litres/hour and frequent Orsat analyses of the mixtures were carried out for oxygen and carbon oxides. Oxygen uptake was rapid and almost complete, and ceased after 5 hours. Thereafter the oxidation was stopped.

During most of the oxidation the off-gas contained 8 to 10% by volume of carbon dioxide. Separation and estimation of acids in the reaction product (228.0 grams), by means of liquid phase partition chromatography, estimation of aldehyde polargraphically, and estimation of propyl propionate by ester value, indicated the following yields based on propionaldehyde remaining in the reactor, due allowance being made for material entrained and collected in the catch-pots (7.6 grams).

Percentage conversion of propionaldehyde
by weight to:
Formic acid _____ 0.7
Acetic acid _____ 6.4
Propionic acid _____ 81.3
Propyl propionate _____ 5.1
Unchanged _____ 1.0
Totally to carbon oxides and unaccounted
for _____ 5.5
——
100.0

(ii) Operation according to the invention

A run was carried out exactly as above, except that the charge contained 5.0 grams of sodium acetate based on propionaldehyde remaining in the reactor:

Percentage conversion of propionaldehyde
by weight to:
Formic acid _____ 0
Acetic acid _____ 0
Propionic acid _____ 91.7
Propyl propionate _____ 3.6
Unchanged _____ 0.9
Totally to carbon oxides and unaccounted
for _____ 3.8
——
100.0

Clearly, the addition of sodium acetate actively suppresses oxidative degradation to lower acids and oxides of carbon and causes a substantial increase in the yield of propionic acid.

EXAMPLE 7

It has been shown above that the presence of basic ion greatly decreases the oxidative degradation of propionic acid. The data given below show that the presence of alkali metal ion does not adversely affect the oxidation of an alkyl aromatic compound in propionic acid as solvent.

The oxidation of para-xylene (40 grams) dissolved in propionic acid (200 grams) was performed in the presence of the catalysts specified in the table below at the boiling point (about 137° C.) using an oxygen rate of 12 litres per hour. The concentrations of manganese and cobalt in runs 1 and 2 are the same as in runs 3 and 4.

| Run No. | Catalyst | | | Time, hours | Weight of terephthalic acid, grams | Purity of terephthalic acid by acid value, percent | Molar conversion to terephthalic acid, percent |
|---|---|---|---|---|---|---|---|
| | Manganese compound, grams | Cobalt compound, grams | Additive, grams | | | | |
| 1 | Mn(Ac)$_2$ 0.2 | Co(Ac)$_2$ 0.1 | NaBr 5.0 | 7 | 47.0 | 96.6 | 72.6 |
| 2 | 0.2 | 0.1 | 5.0 | 20 | 57.9 | 97.4 | 90.1 |
| 3 | MnBr$_2$4H$_2$O 0.33 | CoBr$_2$.6H$_2$O 0.19 | | 7 | 28.0 | 96.5 | 43.1 |
| 4 | 0.33 | 0.19 | | 20 | 56.7 | 98.6 | 89.0 |

Thus run 2, in which 0.016 gram atom of sodium was present per gram mole of total organic compound, gave quite as good molar conversion of para-xylene to terephthalic acid in 20 hours and therefore quite as high a reaction velocity as run 4 in which no sodium was present, and this under conditions which cause very little oxidative degradation of propionic acid.

I claim:

1. In processes for the production of carboxylic acids by oxidation in the liquid phase of at least one member selected from the group consisting of aliphatic aldehydes, alkyl aromatic hydrocarbons, alkyl aromatic heterocyclic compounds, having alkyl groups as the sole substituents, and closely related oxygenated derivatives of these classes of compounds; with oxygen gas in the presence of a bromine compound and as catalyst a metal selected from the group consisting of cobalt and manganese, and in the presence of a saturated aliphatic monocarboxylic acid, the improvement which consists in inhibiting the oxidative degradation of said aliphatic monocarboxylic acid by conducting said process in the further presence of a cation selected from the group consisting of alkali and alkaline earth metal compounds in an amount corresponding to a concentration within the range of from 0.25 to 0.00025 gram atom per gram mole of total organic compounds.

2. A process as claimed in claim 1, in which the starting material is propionaldehyde and propionic acid is produced.

3. A process as claimed in claim 1, in which said concentration of said cation corresponds to from 0.05 to 0.0025 gram atom.

4. A process as claimed in claim 1, wherein said starting material is xylenes.

5. A process as claimed in claim 1, wherein said starting material is di-isopropyl benzene.

6. A process as claimed in claim 1, wherein said starting material is toluene.

7. A process as claimed in claim 1, wherein said starting material is cumene.

8. A process as claimed in claim 1, wherein said starting material is para-toluic acid.

References Cited in the file of this patent
UNITED STATES PATENTS

| | | |
|---|---|---|
| 2,223,494 | Loder | Dec. 3, 1940 |
| 2,245,528 | Loder | June 10, 1941 |
| 2,287,537 | Schulz | June 23, 1942 |
| 2,444,924 | Farkas et al. | July 13, 1948 |
| 2,833,778 | Saffer et al. | May 6, 1958 |
| 2,833,816 | Saffer et al. | May 6, 1958 |